July 10, 1962
M. E. CAMMACK
3,043,070
APPARATUS FOR PACKAGING FROZEN CONFECTIONS
Filed May 27, 1960
4 Sheets-Sheet 1
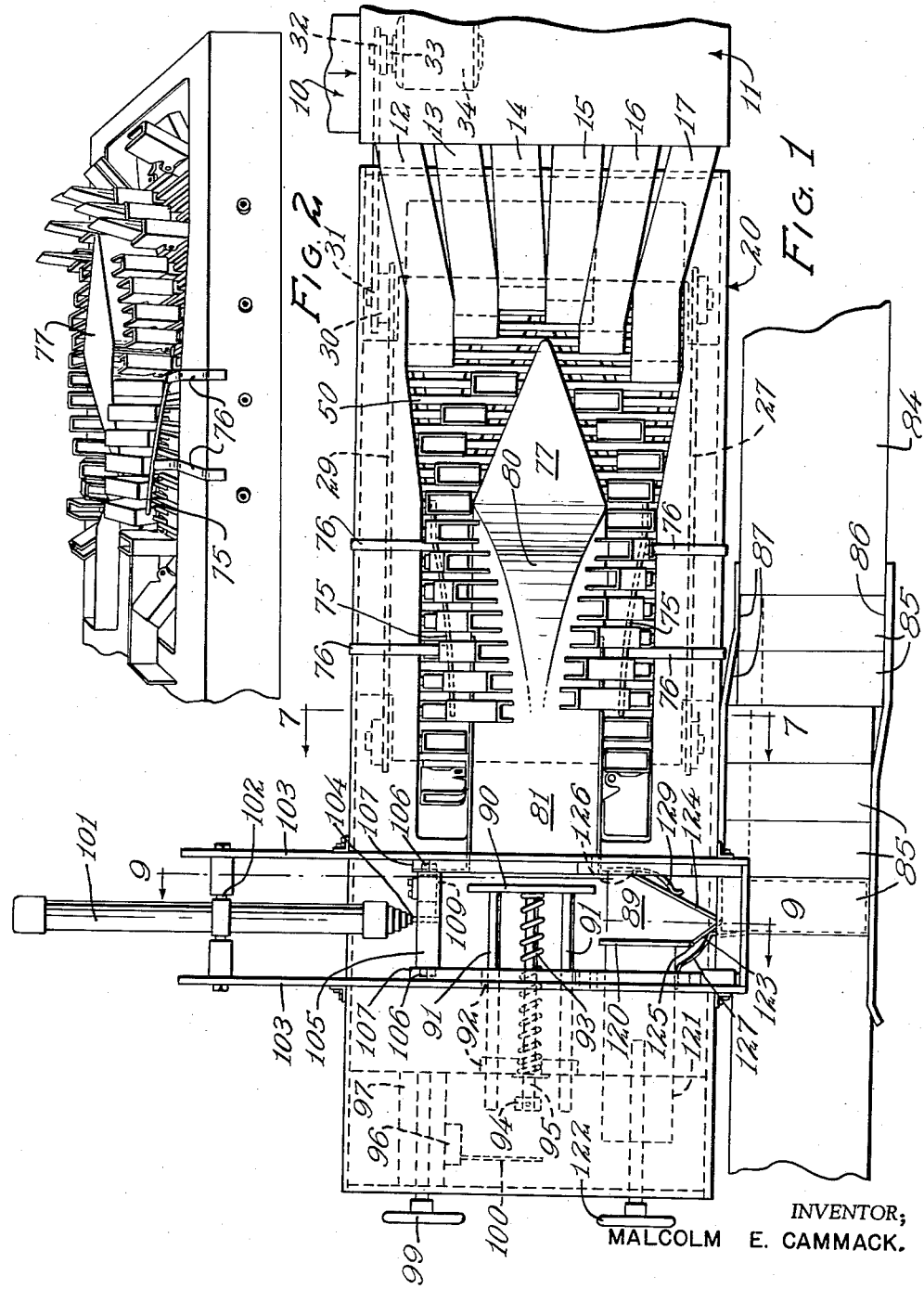
INVENTOR;
MALCOLM E. CAMMACK.
BY *Robert M. Dunning*
ATTORNEY July 10, 1962  M. E. CAMMACK  3,043,070
APPARATUS FOR PACKAGING FROZEN CONFECTIONS
Filed May 27, 1960  4 Sheets-Sheet 2
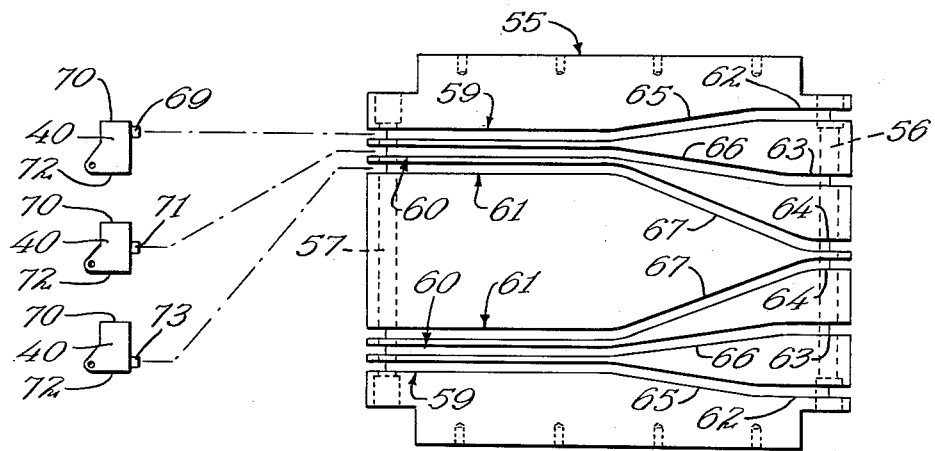
FIG. 3
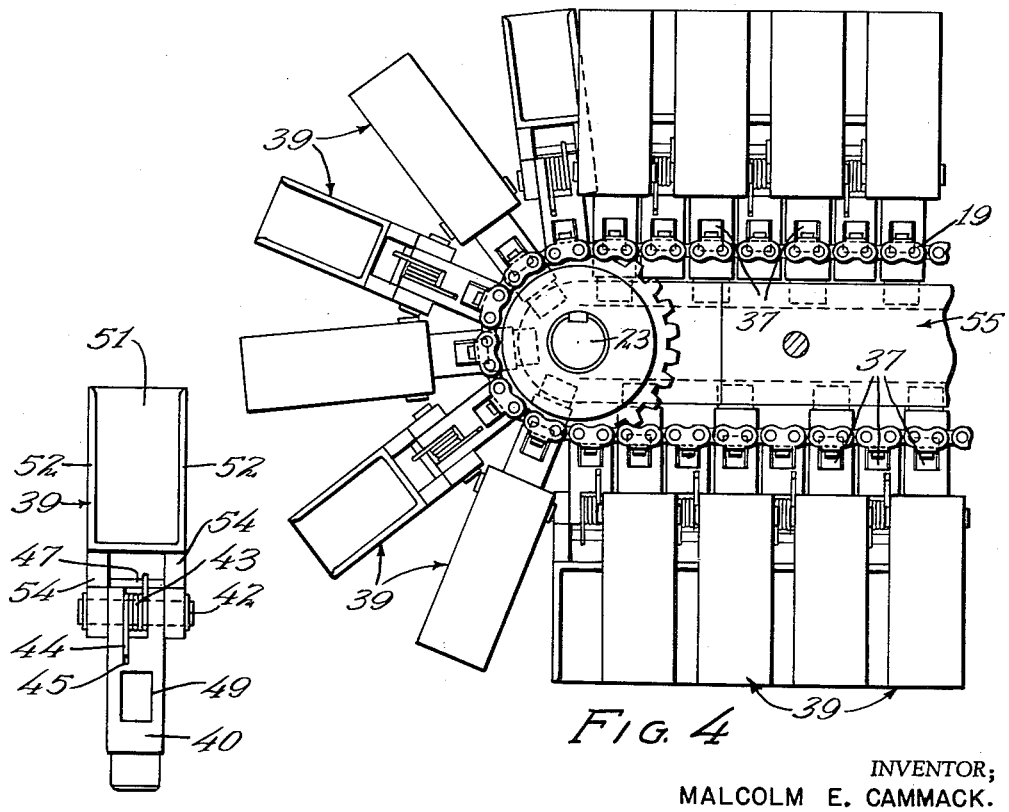
FIG. 4
FIG. 5
INVENTOR;
MALCOLM E. CAMMACK.
BY Robert M. Dunning
ATTORNEY

INVENTOR;
MALCOLM E. CAMMACK.

BY Robert M. Dunning
ATTORNEY

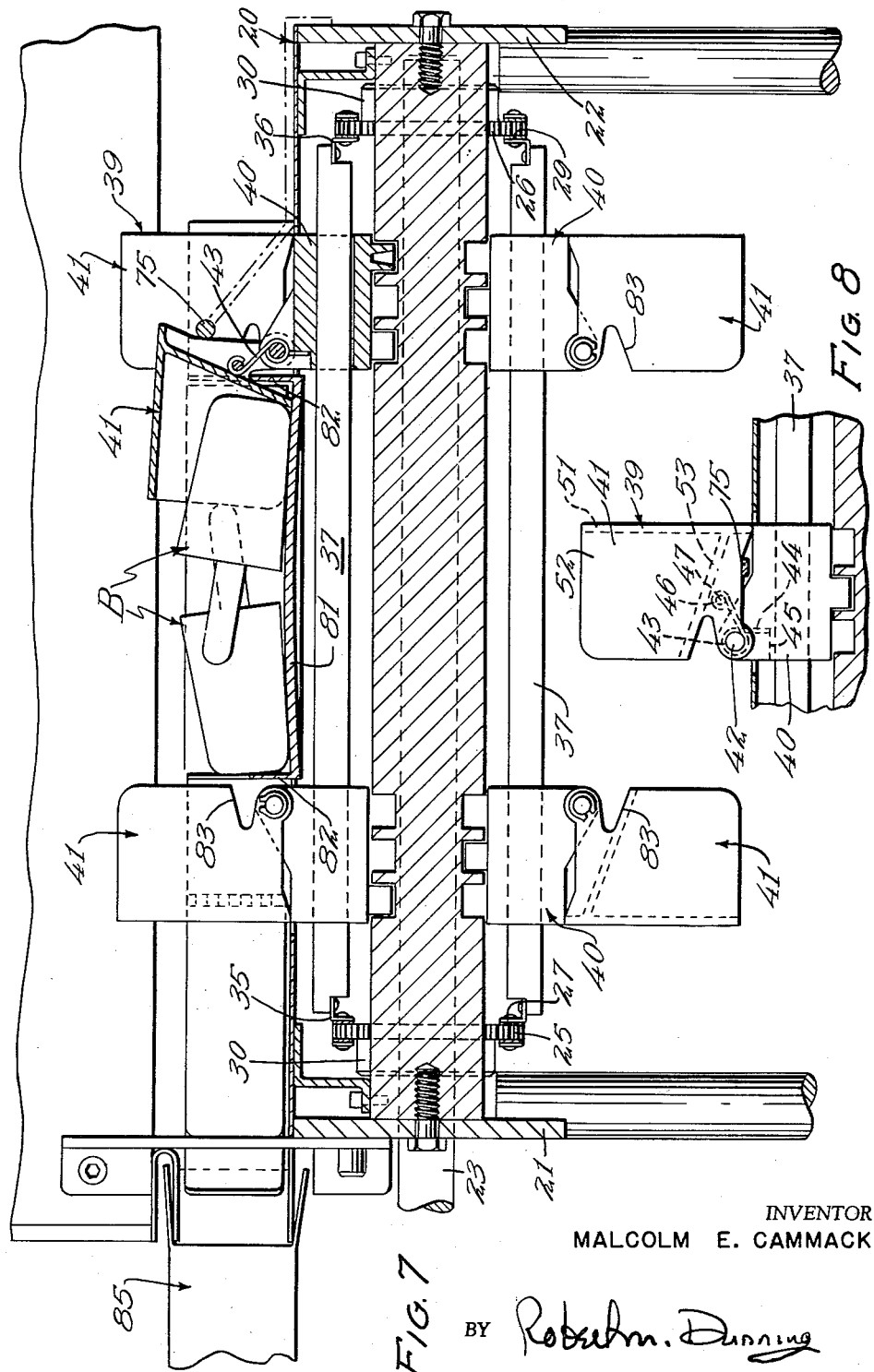

United States Patent Office 3,043,070
Patented July 10, 1962

3,043,070
APPARATUS FOR PACKAGING FROZEN CONFECTIONS
Malcolm E. Cammack, St. Paul, Minn., assignor to Crescent Creamery Company, St. Paul, Minn., a corporation of Minnesota
Filed May 27, 1960, Ser. No. 32,433
16 Claims. (Cl. 53—159)

This invention relates to an improvement in apparatus for packaging frozen confections and deals particularly with an apparatus capable of collecting the frozen confections after they have been inserted into a bag, and in arranging the confections in a predetermined arrangement for insertion into a suitable container.

The packaging of frozen confections which usually comprise a block of frozen material on the end of a stick or similar support has long been somewhat of a problem. During recent years, an apparatus has been produced for gathering the frozen confections from a conveyor belt, and dropping them downwardly into a suitable bag chute. Means are provided on the apparatus for opening a bag of paper, waxed paper, or the like and positioning the bag in the path of movement of the frozen confection so that the confection is enclosed in the bag while the stick or handle is sometimes permitted to project from the bag and in other instances is also enclosed. The confections, thus contained in their bags, are then deposited upon a conveyor belt. As the bagged confections pass along the belt, they are removed by workers who assemble a predetermined number of the confections and place them in a predetermined arrangement in an outer container. The number of confections contained in each container may vary according to requirements. In some instances, half dozen packages of the confections are sold, and in other instances other numbers such as a dozen of the frozen confections are packaged as a unit.

In view of the fact that the confections include a relatively thick body of material projecting from a relatively small handle, the confections are usually packaged in two rows in opposed relationship with the enlarged frozen confection ends of the product outermost, and the handles of the two rows dove tailing together. Where the handles are of the flat type, the handle ends of one row of the products normally are interposed between the enlarged ends of the opposite row of the product to conserve space.

Due to the fact that the bagged products are dropped upon the conveyor belt during the continuous motion of the belt, the position of the product on the belt normally varies considerably making it necessary for the workers to pick up the products individually or in pairs and arranging the product in the carton in proper dove-tail relationship. As the frozen confections are produced at a considerable speed, it is usually necessary to provide several packers along the conveyor to remove the product from the belt and to package them. This work is painstaking and monotonous and it is difficult for any packer to work continuously over an extended period of time without relief. It is a purpose of the present invention to provide an apparatus for automatically collecting the frozen confections as they are discharged from the discharge chutes of the bag machines and to automatically arrange the confections in overlapped relation and to insert a suitable number of these confections in a container.

A feature of the present invention resides in the provision of an endless conveyor upon which is supported a series of pockets, the pockets moving into alignment with the discharge chutes from the bagging apparatus. At predetermined intervals, the frozen confections are dropped from the chutes into the pockets in an upright position with the handle of the confection uppermost. The pockets are provided with an open side from which the confection may be discharged. As the conveyor travels along its endless path, the pockets are gradually tilted from a vertical position to a horizontal position. As the pockets on opposite sides of the conveyor are in staggered relation, the handle end of the confections which project upwardly from the pockets, are guided into overlapping relation with the bodies of the opposed confections so that the confections are deposited upon a delivery shelf in properly overlapping relation. The confections are forced against a pressure plate which retracts as the rows of confections progress against the plate. When the pressure plate has been retracted to a predetermined extent, a means is provided for urging the confection laterally between suitable guides into a receptacle. Thus the receptacles or cartons are automatically filled with a predetermined number of confection units.

A feature of the present invention resides in the provision of a guide against which the pockets are pivoted as the pockets pivot from vertical to horizontal position. This guide acts, in effect, to close the open side of the pocket until the pockets reach a predetermined point in their travel at which time the pockets are released and swing back into vertical position. At this point, the confection units are arranged in overlapping or dovetailed relation upon a feed table which guides them to a position adjacent to the discharge plunger which forces the product laterally into the opened carton.

A further feature of the present invention resides in the means of supporting the pockets so that they are in proper position to receive the confection units from the bagging apparatus. When the pockets are in position to receive the confection units, the pockets are spaced laterally across the supporting conveyor. Means is provided to move the pockets into a single line so that they may be sequentially tilted against the guide to discharge their contents.

A further feature of the present invention resides in the provision of a conveyor including a series of laterally extending and longitudinally spaced guide bars which support the pockets for lateral movement to permit alignment of the pockets into a single row. Guide cams are provided inwardly of the conveyor which guide the pockets from a position in which they are equally spaced laterally of the conveyor to a position in which the pockets are aligned in two parallel rows.

These and other objects and novel features of the present invention will be more clearly and fully set forth in the following specification and claims.

In the drawings forming a part of the specification:

FIGURE 1 is a top plan view of the confection collecting and handling mechanism which receives the confection units from the bag machine and deposits them in proper relation in a suitable container.

FIGURE 2 is a perspective view of a portion of the apparatus illustrated in FIGURE 1.

FIGURE 3 is a diagrammatic view of the cam track which controls the lateral movement of the pocket on the supporting conveyor.

FIGURE 4 is a side elevational view of one end of the conveyor.

FIGURE 5 is an elevational view of one of the pockets showing in general the construction thereof.

FIGURE 7 is a transverse sectional view through the delivery end of the container, the position of the section being indicated by the line 7—7 of FIGURE 1.

3

FIGURE 8 is an elevational view of one of the pockets, showing the construction thereof.

Figure 9:
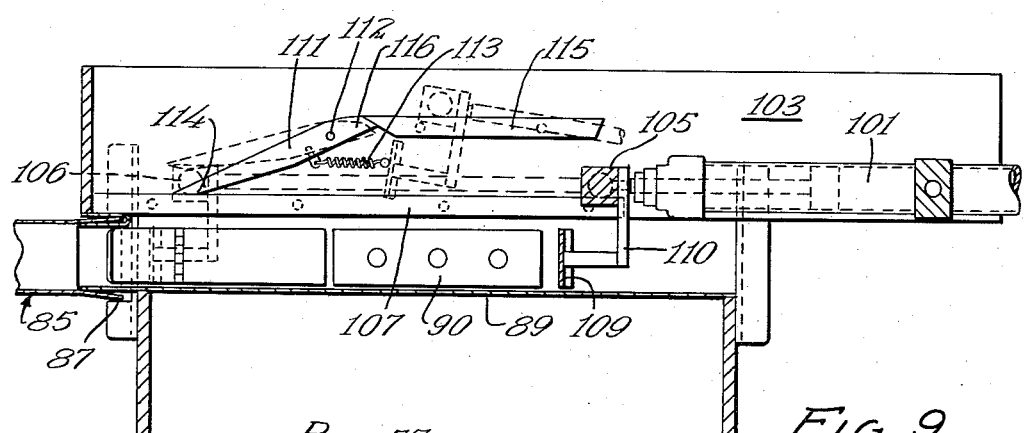

FIGURE 9 is a transverse sectional view through the outlet end of the apparatus, the position of the section being indicated by the line 9—9 of FIGURE 1.

Figure 10:
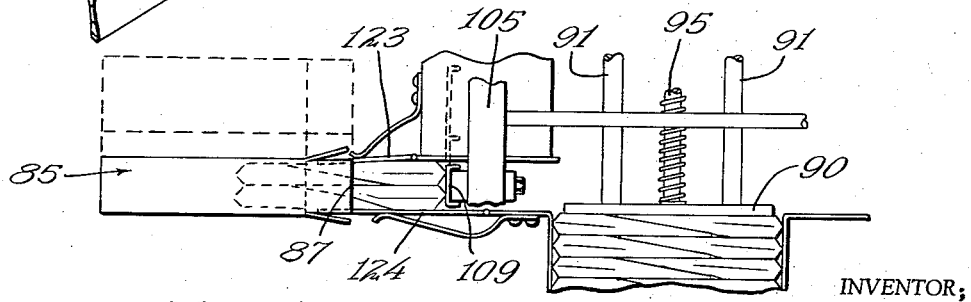

FIGURE 10 is a plan view of a portion of the ejector mechanism showing the manner in which the confection is guided into a suitable container.

The manner in which the confection units are formed is unimportant in the present invention. The confection units are delivered to a conveyor 10, illustrated diagrammatically in FIGURE 1 of the drawings, and into a bag machine which is also illustrated diagrammatically by the numeral 11. This bag machine is shown as having six delivery chutes which are illustrated in general by the numerals 12, 13, 14, 15, 16 and 17. The bagging machine directs the confectionery units to these chutes and move down the chutes with the enlarged frozen end of the units foremost or lowermost. Bags are opened and are supported in the path of the confectionery units dropping through the chutes so that at least the enlarged ends of these units are enclosed. A means is provided at the lower end of each of the chutes for releasing the bagged product at a predetermined time. The releasing of the confection occurs when a confection unit receiving pocket is aligned with the lower end of the chute. As the bagging apparatus may be purchased and is not a part of the present invention, no detail of the unit nor the release mechanism is disclosed.

An endless conveyor 19 is supported for movement in a generally horizontal plane and is supported by the frame of the apparatus, which is illustrated in general by the numeral 20. The frame 20 includes a pair of parallel side plates 21 and 22 which support a pair of pivot shafts such as 23, the shafts 23 being supported by suitable bearings (not illustrated) upon the side plates 21 and 22. The shafts 23 rotatably support a pair of spaced sprockets 25 and 26, the sprockets at opposite ends of the conveyor supporting a pair of endless chains 27 and 29. These sprockets are held from outward movement upon the pivot shaft by suitable means such as by collars 30. As is indicated in dotted outline in FIGURE 1 of the drawings, one of the sprockets such as 30 may be secured for rotation with a sprocket 31 mounted upon the same pivot shaft, the sprocket 31 being connected to a cooperable sprocket 32 mounted on the shaft 33 of the drive motor 34. Thus the motor 34 may provide a means of driving the conveyor either continually or at intervals.

As is perhaps best illustrated in FIGURE 7 of the drawings, the chains 27 and 29 are provided with angle brackets 35 and 36 respectively which support transversely extending rectangular bars 37. In other words, the conveyor includes a pair of spaced endless chains connected by longitudinally spaced bars which act as slide guides for a plurality of confectionery unit receiving pockets, as will be described.

The pocket elements 39 which are slidable upon the bars 37 each include a base portion 40 and a top portion 41, the two portions being pivotally connected by a pivot 42 extending longitudinally of the direction of travel of the conveyor. A torsion spring 43 encircles each pivot 42, and as indicated in FIGURES 5 and 8 of the drawings, one end 44 of the spring 43 is engaged in a slot 45 in the base portion 40 of the pocket, while the other end 46 is anchored to a pin 47 on the upper portion 41 of the pocket. Each spring 43 tends to hold the upper portion of the pocket 46 in an upright position above the lower portion 40.

As is indicated in FIGURE 5 of the drawings, the lower portion 40 is provided with a generally rectangular aperture 49 extending therethrough in right angular relation to the axis of a pivot 42. The aperture 49 is of proper size to slidably accommodate one of the bars 37 of the conveyor, which is indicated in general by the

4 numeral 50. As a result, the pocket members 39 are slidable longitudinally of the bars 37, or laterally with respect to the direction of travel of the conveyor 50.

The upper portion 41 of each pocket element 39 comprises a channel shaped construction including an outer wall 51, and spaced parallel side walls 52. As indicated in FIGURE 8, each pocket also includes a bottom wall 53 which inclines downwardly toward the outer wall 51, the purpose of this arrangement being to hold the confectionery units slightly inclined toward the outer wall 51. Arms 54 project downwardly and inwardly on opposite sides of a portion of the lower pocket member 40 to accommodate the connecting pivot 42.

In view of the fact that the delivery chutes 12 through 17 of the product bagging apparatus are spaced transversely of the conveyor 50, it is necessary that the pocket elements 39 be transversely spaced in a similar manner at the time the pockets are in registry with the lower ends of the chutes. At the same time, it is necessary that the individual pocket be aligned in parallel rows when the pockets are tilted downwardly to discharge their contents so that the products will be properly aligned. In order to accomplish this result, a cam track table is provided inwardly of the conveyor below the upper reach of the conveyor and above the lower reach of the conveyor so as to guide the individual pockets as they are conveyed. One such cam track plate is indicated in FIGURE 3 of the drawings and designated in general by the numeral 55. It should be noted that both the top and bottom cam track plates 55 are identical and that the ends of these plates 55 are either recessed into or else closely adjacent to the spaced pivot shaft 23. Alternatively, the cam plates 55 may be formed as indicated in FIGURE 3 of the drawings as comprising a thick plate having cam tracks extending along both sides thereof, the plate being provided with rounded ends through which the shafts 23 are supported. As indicated in FIGURE 3, the ends of the cam plate 55 are provided with transverse apertures 56 and 57 through which the shafts 23 may extend.

Opposite sides of the longitudinal center of the plate 55 are symmetrical. Each side of the longitudinal center of the plate includes a pair of outer grooves 59, a pair of intermediate grooves 60, and a pair of inner grooves 61. At the end of the plate 55 which comprises the outlet end of the conveyor 50, the cam grooves 59, 60 and 61 are parallel. At the opposite end of the conveyor, where the pocket elements 39 are in registry with the chutes 12 through 17 of the bagging machine, the tracks include track portions 62, 63 and 64 which are also substantially parallel but which are relatively widely spaced apart. Track portions 65, 66 and 67 which are angular relative to the direction of movement of the conveyor, connect the parallel portions at the discharge end of the conveyor with the parallel portions 62, 63 and 64 at the entrance end of the conveyor.

While the various pocket forming elements 39 have been described by the same identifying numerals, these elements differ in one important respect. No two pocket elements are slidably supported upon the same bar 37 as the confectionery units of one row of pockets is to be dovetailed between the similar units of the opposite row. However, the pockets are arranged in pairs with one pocket element of each pair on one bar 37 and the other pocket element of each pair on the next adjacent bar 37. In order that the various pockets be guided by the cam tracks and still be aligned during the tilting of the upper portions of the pockets, the pocket elements in the outermost rows are provided with downwardly extending cam projections 69 which project downwardly from a point near the outer edge 70 of the lower pocket member 40 to engage in the outer cam groove 59. The next pair of pocket forming elements are provided with downwardly extending projections 71 which are positioned intermediate the outer edge and the inner edge 72 of the member 40, these projections 71 being engaged in the intermediate track 60. The next pair of pocket forming members are provided with downwardly extending cam projections 73 which are near the inner edge of the pocket forming members 40. These projections 73 are designed to travel in the inner cam tracks 61. The spacing between the projections 69, the projections 71, and the projections 73 on the members 40 is similar to the spacing between the cam tracks 59, 60 and 61. Thus every third pair of pocket forming elements is guided by the outer track 59, the next pair being guided by the intermediate tracks 60 and the third pair of pocket forming members being guided by the inner tracks 61. While traveling along the parallel portions of these tracks toward the outlet end of the conveyor, the pocket forming elements are properly aligned.

Figure 6:
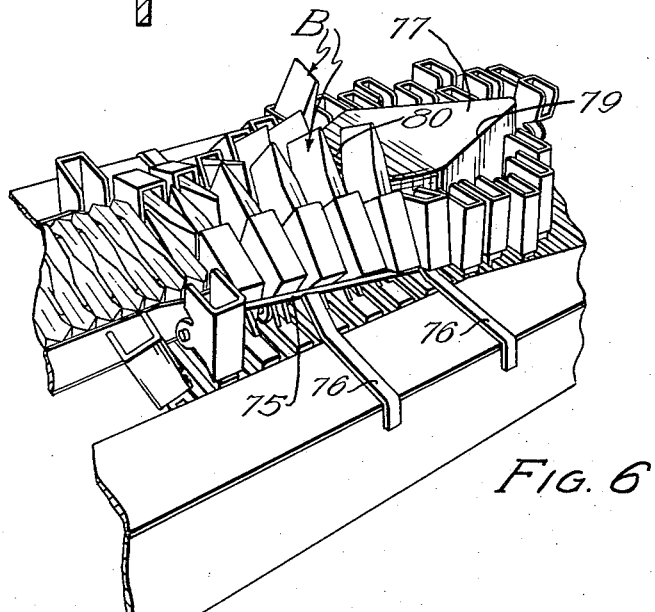
FIGURE 6 is a perspective view showing the manner in which the confection units are swung into dove-tailed relation and supplied to the feed table, portions of the apparatus being omitted in order to show the operation of the apparatus.

As is indicated in FIGURES 1, 2 and 6 of the drawings, a pair of folding horns or bars 75 are supported by brackets 76 on opposite sides of the frame, these bars 75 extending beneath the upper portions 41 of the pocket elements 39 as these pocket elements reach the parallel output portions of the cam grooves 59, 60 and 61 where the pocket forming elements are parallel. These bars 75 are upwardly inclined and are bent inwardly as indicated in FIGURE 1 of the drawings. As a result, the upper portions 41 are tilted inwardly as the conveyor 50 travels toward the discharge end until the upper pocket portions 41 are substantially horizontal. A guide platform 77 is mounted upon the frame of the apparatus between the rows of pocket forming elements. This platform includes walls such as 79 (FIGURE 6) which hold the confection units in certain of the trays from falling between the rows. The upper surface 80 of the platform 77 is so shaped as to form a closure for the open sides of the upper portions 41 of the pocket forming elements as they are tilted downwardly. As noted in FIGURES 2 and 6 of the drawings, the platform 77 holds the various bags of frozen confection, designated by the letter B, during the tilting action of the pockets, and acts to guide the small end of one confection unit between the large ends of the opposed confection units. The folding guides 75 pivot the upper portions 41 of the pocket forming elements until they are substantially horizontal as shown in FIGURE 7 of the drawings, and the folding bar then terminates, permitting the pockets to pivot back into upright position by action of the springs 43.

The platform 80 extends substantially beyond the point at which the upper portions 41 of the pocket forming members 39 spring back into vertical position. As indicated in FIGURE 7 of the drawings, the frozen confections in a nested arrangement are guided upon the platform portion 81 which is either flat or is provided with a slightly convex upper surface as illustrated. Side walls 82 are provided for preventing movement of the frozen confections B laterally of the conveyor so that the operation of the conveyor acts to sequentially deliver the confection units B onto a table portion 81 and to force them gradually toward the outlet end of this table. As indicated in FIGURE 7, the walls of the upper portions of the pocket forming members are notched as indicated at 83 to accommodate the side walls 82. Thus the frozen confections are arranged in proper relation upon the outlet table portion 81 of the platform before the upper portions of these pocket forming members pivot back into vertical position.

With reference now to FIGURE 1 of the drawings, a box opening apparatus 84 is provided which preferably takes flat tubularly arranged cartons such as 85 and opens them into hollow tubular form. Preferably, the outer ends such as 86 of these cartons 85 are closed by any suitable means while the inner ends of the cartons which are directed toward the conveyor and which are indicated by the numeral 87 remain open to receive the frozen confection units from the apparatus. The cartons 85 are of proper proportions to accommodate a predetermined number of frozen confections and certain adjustments are made to the apparatus to urge such a number of the confections to the cartons. Due to the fact that apparatus for erecting flat folded cartons into hollow tubular form is old in the art, and as the details of this apparatus are not important in the present invention, no details are illustrated.

With reference now to FIGURES 1, 9 and 10 of the drawings, it will be noted that a table 89 is provided at substantially the same level as the end of the trough shaped guide table 81 and onto which the confection units in dovetailed relation are forced by movement of the conveyor 50. A pressure plate 90 is supported by guide rods 91 in the path of movement of the confection units moving over a discharge table 81. The guide rods 91 are slidably supported by bearing blocks such as 92 and the bearing plate 90 is urged toward the inlet end of the conveyor 50 by a spring 93. The movement of the pressure plate 90 toward the inlet end of the conveyor 50 is limited by means of a collar 94 upon the guide rod 95 about which the spring 93 is coiled.

A limit switch 96 is provided in the path of movement of one of the guide rods 91 or 95 for controlling the discharge of confections from the supporting table 89 and into the open end 87 of a suitable carton 85. The switch 96 is mounted upon a cross head such as 97 which is adjusted longitudinally of the direction of travel of the conveyor 50 by an adjustment wheel 99. While the details of this construction are not illustrated, it is only important that the position of the switch 96 and its operating arm 100 be adjustable.

A reciprocable fluid cylinder 101 is pivotally supported at 102 between a pair of supporting brackets 103, and a piston within the cylinder 101 is connected to a piston rod 104 to reciprocate the piston rod between predetermined limits of movement. A cross head 105 is secured to the end of the piston rod 104 and is provided on opposite ends with rollers 106 which are supported by tracks 107 extending inwardly from the brackets 103. A pusher plate 109 is secured by means of an angle bracket 110 to the cross head 105, the pusher plate 109 and its bracket 110 being readily detachable so that the width of the plate 109 may be easily changed to engage a different number of the frozen confections. In other words, if four confection units are to be inserted into each carton 85, the pusher plate 109 is somewhat narrower than the pusher plate which would be used to push 6, 8 or 12 of the confection units into a carton.

As indicated in FIGURE 9, a pair of arms 111 are secured to the bracket plates 103 through pivots 112, and springs 113 urge an end 114 of each of the arms 111 against the upper surface of the track 107. A horizontal track 115 is connected to each of the side brackets 103 adjoining the upper ends 116 of the arms 111. The main purpose of this arrangement is to elevate the plunger or pusher plate 109 during the return stroke of the piston within the cylinder 101 so that the pusher plate will return to its starting position without interference with additional frozen confections being forced onto the table 89.

As the cross head 105 moves to the left from the position illustrated in FIGURE 9, the pusher plate 109 engages a predetermined number of the frozen confections and forces them laterally over the surface of the table 89 and into the open end 87 of a carton 85. During movement of the rollers to the left over the upper surfaces of the tracks 107, the rollers 106 engage the ends 114 of the arms 111 and pivot these ends upwardly. The arms 111 then return to the position indicated in full lines in FIGURE 9 of the drawings. Upon a return movement of the crosshead 105, the rollers 106 engage the upper surfaces of the arms 111 and ride over the upper surfaces of these arms and over the elevated tracks 115. This action continues until the pressure plate 109 has moved over and beyond the frozen confection units being urged against the pressure plate 90. At this point, the heavier plunger end of the cylinder 101 swings downwardly until the pressure plate 109 is positioned just above the table 89, or in position to engage another series of frozen confection units and to urge these units into the receiving cartons 85.

The operation of the apparatus is mainly described in conjunction with the description of the apparatus. The frozen confection units are formed in any desired manner, and are delivered in any way onto a conveyor belt 10 which normally moves transversely of the packaging apparatus. The conveyor 10 delivers the frozen confections to chutes which are indicated by the numerals 12 through 17 into which the units drop with the heavy frozen ends thereof lowermost. The confection units drop into open bags which are supported in the path of movement of the units and are guided through the lower ends of the chutes and into the pocket forming elements 39 when these pocket forming elements are properly aligned with the lower ends of the chutes.

Due to the fact that the chutes are spaced transversely of the conveyor which conveys the pocket forming elements toward discharge position, the pocket forming elements are guided into staggered relation in order to properly receive the units. As each confection unit is dropped into the upper portion 41 of a pocket forming element, the heavy lower end thereof is tilted so that the confection tends to be located against the outer wall 51 of the pocket, or away from the open side thereof.

The pocket forming elements 39 are guided by the three cam tracks 59, 60 and 61 from a staggered relationship into a single line on each side of the conveyor. This single line is accomplished by properly locating the projections such as 69, 71 and 73 which permit the pocket forming members to be guided by separate cam tracks and yet be aligned toward the outlet end of the conveyor 50. The folding bars 75 then engage each successive pocket member 41 of each of the two rows, and tilt these pocket forming members into substantially horizontal position with the handle ends of the confection units of one row being dove tailed between the larger ends of the confection units of the opposite row. During this tilting action, the open sides of the pockets are closed by the platform member 77 which prevents the confection units from dropping from the pockets.

When the pocket forming members are pivoted downwardly into substantially horizontal position, they are sequentially disengaged from the ends of the folding bars 75. However, due to the proximity between the confection units deposited and those which have been previously deposited, the confection units cannot twist about their axes. As each of the pocket forming members 41 moves over the tabel 81, it engages the side of a confection unit previously deposited on the table and tends to urge it forwardly until this pocket forming member is released by the folding bar 75 so that this member springs back up into vertical position. As a result, the confection unit which has been last forced onto the table 81 is only spaced from the confection previously deposited by the thickness of the wall of the pocket forming element. The confection unit is also prevented from tilting rearwardly by movement of the subsequent pocket forming elements so that the confection units on the discharge table portion 81 of the platform 77, as well as upon the table 89 are held snugly together. It must also be remembered that the foremost confection units of the series are against the pressure plate 90 until they are removed therefrom by the plunger pressure plate 109. As soon as this pusher plate 109 passes the pressure plate 90, the pressure plate 90 is forced outwardly against the confection before the units fall over. If necessary, the individual units may be held in upright position by movement restraining springs or the like.

A side guide 120 is mounted upon a slide 121 moveable longitudinally of the direction of movement of the conveyor 50 and is adjustable by means of an adjustment wheel 122 to increase or decrease the distance between the guide 120 and the bracket 103 nearest the inlet of the conveyor. Angularly converging guide plates 123 and 124 are pivotally secured to guide the confection into the carton 85. The guide plate 123 is pivotally connected at 125 to the side guide 120, while the guide plate 124 is pivotally connected at 126 to the brackets 103. Springs such as 127 and 129 are provided in order to normally hold the guide plates in a converging relation outwardly of the ends of the cartons 85. However, when the confection is urged into the carton, the guide plates 123 and 124 pivot outwardly against the flaps at the open end 87 of the carton so as to guide the confection units into the interior of the cartons.

Once the pusher plate 109 has passed the pressure plate 90, the pressure plate 90 may move back into projected position. After the confection units have been inserted into the carton 85, the cross head 105 is guided by the arms 111 to an elevated position, raising the pusher plate above the path of movement of the confection units and back to starting position.

In accordance with the patent statutes, I have described the principles of construction and operation of my improvement in apparatus for packaging frozen confections, and while I have endeavored to set forth the best embodiment thereof, I desire to have it understood that changes may be made within the scope of the following claims without departing from the spirit of my invention.

I claim:

1. A packaging machine for packaging articles, the apparatus including an endless conveyor, a series of pocket forming elements on said conveyor and movable therewith, and arranged in a pair of spaced rows, each of said pocket forming elements being designed to contain an article and having an open inner side, said elements being pivotal on axes parallel to the direction of movement of the conveyor upon movement of said conveyor, means pivoting said elements of each row sequentially inwardly toward the elements of the other row upon movement of said conveyor to position the open sides of said elements directed downwardly, and guide means acting as a closure for said open sides during the downward pivotal movement thereof.

2. The packaging machine of FIGURE 1 and including means for inserting articles in said elements, the elements of said two rows being staggered to permit the articles of each row to pivot between the articles of the other row.

3. A packaging machine including an endless conveyor, a series of normally upright pocket forming elements on said conveyor and movable therewith, said pocket forming elements having open inner sides and an open top, means pivotally connecting said pocket forming elements to said conveyor on axes parallel to the direction of movement of said conveyor, means engageable with said pocket forming elements for pivoting the same in the direction of the open inner sides thereof, guide means adjoining the open sides of said elements to prevent the discharging of articles from said pocket forming elements until said pocket forming elements have pivoted through an angle of substantially ninety degrees, and means for pivoting said elements back into upright position.

4. A packaging machine including an endless conveyor, a series of normally upright pocket forming elements on said conveyor and movable therewith, said pocket forming elements having open inner sides, means pivotally connecting said pocket forming elements to said conveyor on axes parallel to the direction of movement of said conveyor, means engageable with said pocket forming elements for pivoting the same in the direction of the open inner sides thereof, guide means adjoining the open sides of said elements to prevent the discharging of articles from said pocket forming elements until said pocket forming elements have pivoted through an angle of substantially ninety degrees, and means for pivoting said elements back into upright position, and a table adjoining the open sides of said elements onto which the elements are deposited when said elements return to upright position.

5. The structure of claim 4 and in which the pocket forming elements are in close proximity and in which each pocket forming member in inwardly pivoted position engages the article previously deposited on said table upon movement of said pocket forming elements and acts to move the articles previously deposited on said table in the direction of movement of said conveyor.

6. A packaging machine, including an endless conveyor, a series of normally upright pocket forming elements on said conveyor and movable therewith, said pocket forming elements having open inner sides and an open top, means pivotally connecting said pocket forming elements to said conveyor on axes parallel to the direction of movement of said conveyor, means engageable with said pocket forming elements for pivoting the same in the direction of the open inner sides thereof, guide means adjoining the open sides of said elements to close the open sides and to prevent the discharging of articles from said pocket forming elements until said pocket forming elements have pivoted through an angle of substantially ninety degrees, means for pivoting said pocket forming elements back into upright position, a table onto which the articles are deposited upon return of the elements to upright position, each pocket forming member in inwardly pivoted position acting upon movement of said conveyor acting to move articles on said table in the general direction of movement of said conveyor, and means engageable with a predetermined number of articles on said table to move the articles laterally of the direction of movement of said conveyor.

7. The structure of claim 6 and in which said last named means includes a plunger.

8. An article collecting apparatus including an endless conveyor including upper and lower reaches, said conveyor including longitudinally spaced laterally extending bars, pocket forming elements slidably supported for movement laterally of the direction of movement of the conveyor on said bars, said pocket forming elements including base portions slidably supported on said bars and pocket portions pivotally connected to said base portions on axes substantially parallel to the direction of travel of the upper reach of the conveyor, means normally biasing said pocket portions toward upright position, said pocket forming elements being arranged in two sections on opposite sides of the center of the conveyor, the pocket portions having open inner sides and open upper ends, means engageable with said pocket portions to pivot the same inwardly with the open sides lowermost, said last named means releasing said pocket portions after said pocket portions have been pivoted through substantially ninety degrees and permitting these pocket portions to pivot back into upright position, and guide means between said two sections of elements acting as a closure for the open sides of said pocket portions during the inward pivoting thereof, and onto which articles in said pocket portions are deposited when said pocket portions return to upright position.

9. The structure of claim 8 and including means engageable with the base portions of said pocket forming elements for sliding said elements laterally on said bars during movement of said conveyor.

10. The structure of claim 8 and including means engageable with the base portions of said pocket forming elements for moving said base portions laterally on said bars during movement of said conveyor, said last named means guiding said elements from a position in which certain of said elements are laterally offset relation to others to a position in which said elements are aligned longitudinally of said conveyor in two spaced rows.

11. The structure of claim 8 and including cam track means between the reaches of said conveyor, and means on the base portions of said pocket forming elements engageable in said cam track means to move said elements laterally on said bars.

12. An article collecting apparatus including an endless conveyor including upper and lower reaches, said conveyor including longitudinally spaced laterally extending bars, pocket forming elements slidably supported on said bars, said pocket forming elements including base portions slidably supported on said bars for movement laterally of said conveyor and pocket portions pivotally connected to said base portions on axes substantially parallel to the direction of travel of the upper reach of the conveyor, means normally biasing said pocket portions toward upright position, said pocket forming elements being arranged in two sections on opposite sides of the center of the conveyor, the pocket portions having open inner sides and open upper ends, means engageable with said pocket portions to pivot the same inwardly with the open sides lowermost, said last named means releasing said pocket portions after said pocket portions have been pivoted through substantially ninety degrees and permitting these pocket portions to pivot back into upright position, and guide means between said two sections of elements acting as a closure for the open sides of said pocket portions during the inward pivoting thereof, and onto which articles in said pocket portions are deposited when said pocket portions return to upright position, cam track means between the conveyor reaches, cam track engaging means on said base portions of said pocket forming elements, there being a plurality of cam tracks on either side of the longitudinally extending center line of said cam track means, said cam track engaging means being continually engaged in one of said cam tracks during movement of said conveyor.

13. An article collecting apparatus including an endless conveyor including upper and lower reaches, said conveyor including longitudinally spaced laterally extending bars, pocket forming elements slidably supported on said bars, said pocket forming elements including base portions slidably supported on said bars and pocket portions pivotally connected to said base portions on axes substantially parallel to the direction of travel of the upper reach of the conveyor, means normally biasing said pocket portions toward upright position, said pocket forming elements being arranged in two sections on opposite sides of the center of the conveyor, the pocket forming elements having open inner sides and open upper ends, means engageable with said pocket portions to pivot the same inwardly with the open sides lowermost, said last named means releasing said pocket portions after said pocket portions have been pivoted through substantially ninety degrees and permitting these pocket portions to pivot back into upright position, and guide means between said two sections of elements acting as a closure for the open sides of said pocket portions during the inward pivoting thereof, and onto which articles in said pocket portions are deposited when said pocket portions return to upright position, cam track means between the conveyor reaches, cam track engaging means on said base portions of said pocket forming elements, there being a plurality of cam tracks on either side of the longitudinally extending center line of said cam track means, said cam track engaging means being continually engaged in one of said cam tracks during movement of said conveyor, said cam tracks being arranged in pairs on opposite sides of the said center line with the two tracks of each pair equally spaced therefrom, said tracks being widely spaced laterally of the conveyor at one end of the conveyor and closely spaced and parallel at the other end thereof.

14. The structure of claim 13 and in which the cam track engaging means engaging each track are laterally offset relative to the cam track engaging the other tracks, whereby said pocket forming elements are aligned when said cam track engaging means are engaged in said parallel portions of said cam tracks.

15. A packaging machine for packing elongated articles having a relatively large end and a relatively small end, a table, means for receiving said articles and depositing said articles on said table in two rows with the large ends outermost and the small ends of the articles of one row dovetailed between the small ends of the articles of the other row, conveyor means moving said rows of articles across said table, a retractable bearing plate against which the ends of the rows abut, movement of said rows retracting said plate, plunger means supported for movement in a direction laterally of the direction of movement of said rows, said plunger means being engageable with a predetermined number of articles adjacent said plate for moving the same laterally from said rows, and means controlled by the retraction of said plate to a predetermined position to operate said plunger.

16. The structure of claim 15 and including a carton support holding a carton in the path of articles moved by said plunger.

References Cited in the file of this patent
UNITED STATES PATENTS
2,755,907    McCullough _____ July 24, 1956